United States Patent
Lee et al.

(10) Patent No.: US 10,616,304 B2
(45) Date of Patent: Apr. 7, 2020

(54) AUDIO DEJITTERING USING DELAY STANDARD DEVIATION

(71) Applicant: QUALCOMM Incorporated, San Diego, CA (US)

(72) Inventors: Tony Lee, San Diego, CA (US); Matthew Zivney, San Diego, CA (US); Manjunatha Kantharaju, Bangalore (IN)

(73) Assignee: QUALCOMM Incorporated, San Diego, CA (US)

(*) Notice: Subject to any disclaimer, the term of this patent is extended or adjusted under 35 U.S.C. 154(b) by 29 days.

(21) Appl. No.: 15/992,655

(22) Filed: May 30, 2018

(65) Prior Publication Data

US 2019/0373041 A1 Dec. 5, 2019

(51) Int. Cl.
| | | |
|---|---|---|
| *H04L 29/06* | (2006.01) | |
| *H04L 12/26* | (2006.01) | |
| *H04L 12/825* | (2013.01) | |
| *H04L 12/801* | (2013.01) | |

(52) U.S. Cl.
CPC .......... *H04L 65/80* (2013.01); *H04L 43/087* (2013.01); *H04L 47/14* (2013.01); *H04L 47/25* (2013.01); *H04L 65/1016* (2013.01)

(58) Field of Classification Search
CPC ... H04L 65/80; H04L 65/1016; H04L 43/087; H04L 47/14; H04L 47/25
See application file for complete search history.

(56) References Cited

U.S. PATENT DOCUMENTS

| | | | |
|---|---|---|---|
| 6,912,203 B1* | 6/2005 | Jain | H04L 43/0858 370/241 |
| 2004/0165570 A1* | 8/2004 | Lee | H04L 45/12 370/349 |
| 2004/0193762 A1* | 9/2004 | Leon | H04L 29/06027 710/52 |
| 2004/0252700 A1* | 12/2004 | Anandakumar | H04L 29/06027 370/395.21 |
| 2005/0094628 A1* | 5/2005 | Ngamwongwattana | H04L 1/0002 370/352 |
| 2006/0056383 A1* | 3/2006 | Black | G10L 19/005 370/350 |
| 2006/0143335 A1* | 6/2006 | Ramamoorthy | G09G 5/006 710/58 |
| 2007/0019552 A1* | 1/2007 | Senarath | H04L 47/10 370/235 |
| 2015/0092585 A1* | 4/2015 | Shao | H04L 43/087 370/252 |
| 2016/0344608 A1* | 11/2016 | Siemens | H04L 43/12 |
| 2018/0295050 A1* | 10/2018 | Lee | G06F 3/165 |

* cited by examiner

*Primary Examiner* — Stephen J Clawson
(74) *Attorney, Agent, or Firm* — Holland & Hart LLP/Qualcomm Incorporated

(57) ABSTRACT

Methods, systems, and devices for audio dejittering are described. The method may include determining a mean delay applied to packets in a packet voice communication system, calculating, from the mean delay, a standard deviation for at least a subset of packets in a talk spurt, determining a target delay for the talk spurt by applying a moving average to the standard deviation, and applying the target delay to a first packet from the talk spurt.

17 Claims, 10 Drawing Sheets

AUDIO DEJITTERING USING DELAY STANDARD DEVIATION

BACKGROUND

The following relates generally to audio dejittering, and more specifically to using delay standard deviation to improve or optimize audio dejittering.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each supporting communication for multiple communication devices, which may be otherwise known as user equipment (UE).

SUMMARY

The described techniques relate to improved methods, systems, devices, and apparatuses that support improvising audio dejittering using delay standard deviation from one or more determined values, such as a delay mean. The techniques may relate to determining a delay (e.g., a mean delay) applied to packets in a packet voice communication system. The techniques may further relate to calculating a parameter (e.g., a standard deviation) for at least a subset of packets in a group (e.g., a talk spurt) based on the delay and determining a target delay for the group by applying an adjustment or factor (e.g., a moving average) to the parameter, and applying the target delay to at least one packet from the group.

A method of audio dejittering at a device is described. The method may include determining a mean delay applied to packets in a packet voice communication system, calculating, from the mean delay, a standard deviation for at least a subset of packets in a talk spurt, determining a target delay for the talk spurt by applying a moving average to the standard deviation, and applying the target delay to a first packet from the talk spurt.

An apparatus for audio dejittering at a device is described. The apparatus may include a processor, memory in electronic communication with the processor, and instructions stored in the memory. The instructions may be executable by the processor to cause the apparatus to determine a mean delay applied to packets in a packet voice communication system, calculate, from the mean delay, a standard deviation for at least a subset of packets in a talk spurt, determine a target delay for the talk spurt by applying a moving average to the standard deviation, and apply the target delay to a first packet from the talk spurt.

Another apparatus for audio dejittering at a device is described. The apparatus may include means for determining a mean delay applied to packets in a packet voice communication system, calculating, from the mean delay, a standard deviation for at least a subset of packets in a talk spurt, determining a target delay for the talk spurt by applying a moving average to the standard deviation, and applying the target delay to a first packet from the talk spurt.

A non-transitory computer-readable medium storing code for audio dejittering at a device is described. The code may include instructions executable by a processor to determine a mean delay applied to packets in a packet voice communication system, calculate, from the mean delay, a standard deviation for at least a subset of packets in a talk spurt, determine a target delay for the talk spurt by applying a moving average to the standard deviation, and apply the target delay to a first packet from the talk spurt.

Some examples of the method, apparatuses, and non-transitory computer-readable medium described herein may further include operations, features, means, or instructions for processing at least the subset of packets in the talk spurt after determining the target delay applied to the first packet may be lapsed.

Some examples of the method, apparatuses, and non-transitory computer-readable medium described herein may further include operations, features, means, or instructions for calculating, from the mean delay, a standard deviation for each packet in the talk spurt, where determining the target delay for the talk spurt by applying the moving average to the standard deviation may be based on calculating the standard deviation for each packet in the talk spurt.

Some examples of the method, apparatuses, and non-transitory computer-readable medium described herein may further include operations, features, means, or instructions for determining that the determined target delay may be less than a predetermined minimum delay and setting the target delay to the predetermined minimum delay.

Some examples of the method, apparatuses, and non-transitory computer-readable medium described herein may further include operations, features, means, or instructions for determining that the determined target delay may be greater than a predetermined maximum delay and setting the target delay to the predetermined maximum delay.

In some examples of the method, apparatuses, and non-transitory computer-readable medium described herein, the target delay may be based on an underflow rate of a dejitter buffer of the digitized voice system.

In some examples of the method, apparatuses, and non-transitory computer-readable medium described herein, the target delay may be based on a number of packets in the talk spurt.

In some examples of the method, apparatuses, and non-transitory computer-readable medium described herein, determining the mean delay may include operations, features, means, or instructions for measuring a mean delay for each packet in a set of packets from the packet system and determining whether the measured mean delay of each packet converges.

Some examples of the method, apparatuses, and non-transitory computer-readable medium described herein may further include operations, features, means, or instructions for selecting a factor f and a scalar w and determining the target delay based on the factor f and the scalar w, where f, or w, or both, may be tuned to achieve a balance between mean opinion score (MOS) of the packet voice communication system and the target delay.

In some examples of the method, apparatuses, and non-transitory computer-readable medium described herein, selecting the factor f and the scalar w may include operations, features, means, or instructions for using supervised learning, or non-linear regression, or both to select the factor f and the scalar w.

DETAILED DESCRIPTION

Figure 1:
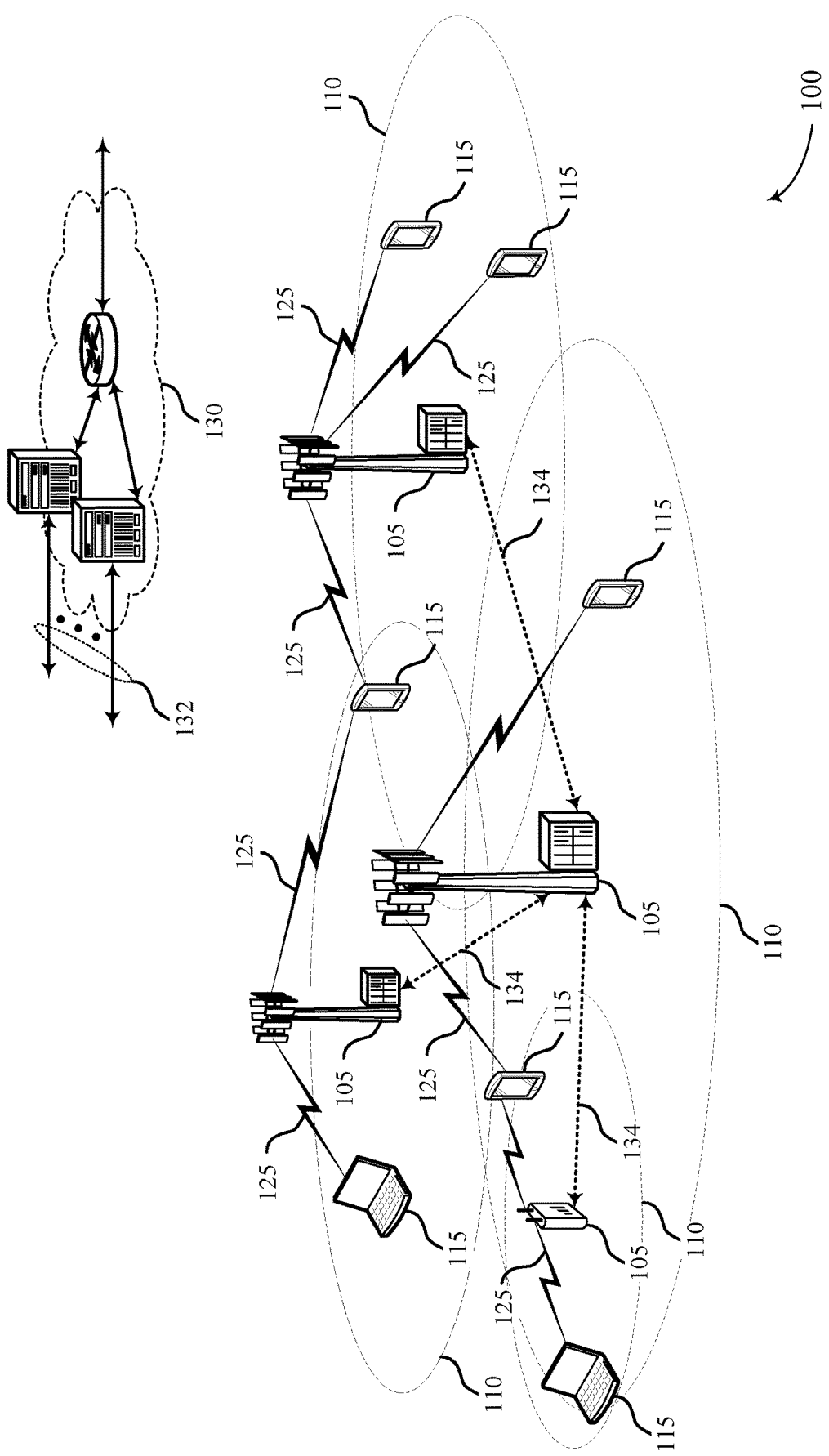
FIG. 1 illustrates an example of a system for audio dejittering that supports using delay standard deviation to improve audio dejittering in accordance with aspects of the present disclosure.

The following relates generally to dejittering of audio in digitized voice communication systems such as internet protocol (IP) multimedia subsystem (IMS) networks (e.g., voice over IP (VoIP), voice over wireless local area network (VoWLAN), voice over long-term evolution (VoLTE)). Some IMS solutions for underflow rate-based dejittering have various disadvantages. For example, with some underflow rate-based dejittering, the target delay may be increased or decreased by a single fixed amount at each talk spurt (e.g., 20 ms). Additionally, in some underflow rate-based dejittering, the underflow rate may be slow to adapt to changes in network jitters.

Aspects of the disclosure are initially described in the context of a wireless communications system. Aspects of the disclosure are further illustrated by and described with reference to apparatus diagrams, system diagrams, and flowcharts that relate to using delay standard deviation to improve or optimize audio dejittering.

In some examples, a talk spurt may include a continuous (e.g., every 20 ms) flow of speech packets in a monotonically increasing real-time transport protocol (RTP) sequence numbers without any silence packets (e.g., silence insertion descriptor (SID) packet). As soon as the first packet of a talk spurt is played/rendered by an audio codec, after each interval of 20 ms another speech packet may arrive with a sequence number that is one greater than that of a previous packet. Each arriving packet may be given to the audio codec for playback until a silence packet is encountered. If a next speech packet with a sequence number X does not arrive from the network within the 20 ms window, an underflow for this next speech packet occurs, resulting in no speech data being provided to the audio codec. As a result, error concealment logic from the audio codec may be implemented, which may adversely affect audio quality.

In order to improve audio quality, the new techniques disclosed herein reduce the amount of underflow associated with an IMS jitter buffer. In some cases, underflows in an IMS jitter buffer may be measured based on mean opinion score (MOS), where the higher MOS score the better the audio quality. To reduce delay associated with IMS communications, the new techniques reduce, among other advantages, the amount of delay added to the packets by IMS jitter buffer. In some cases, more delay may be added to the jitter buffer to reduce the underflows and as a result improve MOS. Adding more delay, however, may result in a higher end-to-end delay if not otherwise addressed.

In some examples, an IMS audio dejitter buffer may apply a target delay between a predetermined maximum dejitter delay and a predetermined minimum dejitter delay the moment a first packet of a talk spurt is received. In some cases, target delay may be determined based on some calculation or determination (e.g., related to hysteresis) that evaluates the amount of underflows experienced in the past and it can increase and decrease within the preconfigured range.

In some cases, target delay may be added to each talk spurt (e.g., to the beginning or first packet of each talk spurt) so that the playout of the first packet is delayed by the target delay time to accommodate higher packet delays (i.e., jitters) that may occur during a given talk spurt to avoid underflows. In one example, the distribution of packet delays in an audio traffic model may be modeled based on a continuous probability distribution (e.g., Gaussian distribution). In one example of the audio traffic model, the amount of underflows is at the mercy of the first packet arrival time.

In some cases, the techniques may be used to or the apparatus components may determine whether the underflow rate is improving based on mean delay optimization or improvement. For example, the techniques disclosed herein may be used to determine that the underflow rate is improving when the underflow rate is decreasing. Additionally or alternatively, the new techniques may be used to determine that the underflow rate is improving when the underflow rate dips below a predetermined threshold. In some examples, when it is determined that the underflow rate is not improving or is not improving at a given threshold rate, then the new techniques may be used to help increase the target delay (e.g., monotonically increasing).

In one example, the ideal target delay may be determined to be 80 ms based at least in part on calculating one or more standard deviations. After calculation of one or more additional standard deviations, the new techniques may be used to determine the ideal target delay to be 50 ms. However, if it is determined that the underflow rate does not improve (or is not improving at a given threshold rate), the new techniques may be used to block the 50 ms target delay and maintain the target delay at the original 80 ms at least until it is determined the underflow rate is improving. On the other hand, after calculation of one or more additional standard deviations, the ideal target delay may be determined to be 90 ms, upon which the target delay may be raised from the original 80 ms to 90 ms whether or not the underflow rate is improving.

When it is determined that the actual delay is below a determined mean delay, a difference between the actual delay and the mean delay may be determined and this difference may be added to the target delay. In some cases, the new techniques may then add additional delay to get the actual delay up to the target delay. When it is determined that the actual delay is above the determined mean delay and below the target delay, the difference between the actual delay and the target delay may be determined, and this difference may be added to the actual delay to get the actual delay up to the target delay. When the actual delay is determined as being above mean delay and target delay, the one or more packets may be processed without adding any additional delay.

In one example, when the average delay introduced by the network on each of the packets based on normal or Gaussian distribution is M (i.e., mean delay), and assuming a jitter buffer target delay of D is applied to the first packet of a talk spurt, then the average end-to-end delay of dejittering would be M plus D. When the average delay introduced by the network on each of the packets based on normal or Gaussian distribution is M (i.e., mean delay), and assuming a jitter buffer target delay of D, any network delay of the packet (i.e., D) that is less or equal to M+D may be adjusted as needed to have an average delay of M+D. On the other hand, any packet delay that is higher than M+D may be simply processed and played out immediately, with the delay of the packet from the network, which is greater than M+D.

The new techniques (and related methods, systems, devices, and apparatuses) address the disadvantages of other underflow rate-based dejittering and improve the MOS of the affected network. The improvements enable the present techniques to quickly and properly adapt to network jitter condition changes to improve MOS (i.e., reduction of delayed underflows) with minimal effect on the end-to-end delay (e.g., delay on a communication link between a first device and a second device).

The new techniques (and related methods, systems, devices, and apparatuses) monitor delays of packets of digitized audio in a digitized voice system (e.g., VoWLAN, VoLTE). In some embodiments, the new techniques may relate to or be based on identifying a mean delay applied to the packets of the digitized voice systems. In some cases identify the mean delay may be based on determining when the mean delay converges.

In some examples, the new techniques may use the mean delay to calculate the standard deviation for each packet in a given talk spurt. In some cases, the new techniques may relate to or be based on calculating the standard deviation from mean delay for each speech packet per each talk spurt. The following is one embodiment of an equation for calculating the standard deviation for each packet in a given talk spurt:

$$talkspurt_{Delay\_StdDev} = \sqrt{\frac{\sum_{i=0}^{n-1}(pkt_{Delay_i} - mean_{Delay})^2}{n}}$$

where $pkt_{Delay_i}$ may represent the packet delay of each packet in the given talk spurt, $mean_{Delay}$ may represent the mean delay for the packets of the given talk spurt or mean delay of packets from two or more talk spurts, and n may represent the number of packets in the given talk spurt.

In some cases, the new techniques may relate to or be based on using the standard deviation of the delay, calculated from the mean delay for every speech packet, to determine an appropriate target delay for each talk spurt. In some embodiments, the new techniques may relate to or be based on determining a target delay for the talk spurt by applying a filtered exponential moving average to the standard deviation. The following is one embodiment of an equation for calculating the target delay (e.g., dejittering target delay):

$$TargetDelay_{Avg} = f * w * talkspurt_{Delay\_StdDev} + (1-f) * TargetDelay_{Avg}$$

where f may represent a predetermined factor used to calculate the target delay, w may represent a predetermined scalar value used to calculate the target delay, $talkspurt_{Delay\_StdDev}$ may represent the standard deviation for each packet in a given talk spurt, and $TargetDelay_{Avg}$ may represent the average target delay of packets from the given talk spurt or the average target delay of packets from two or more talk spurts.

In some embodiments, the scalar w may be dynamically inflated or deflated based on the existing underflow rate logic. When w has been inflated to be greater than its default minimum value, and it is not less than the w calculated in the previous target delay update, then target delay may be calculated as follows:

$$TargetDelay_{Avg} = MAX(Prev\_TargetDelay_{Avg} f * w) * talkspurt_{Delay\_StdDev} + (1-f) * TargetDelay_{Avg})$$

where $Prev\_TargetDelay_{Avg}$ is the target delay from the previous update, f may represent a predetermined factor used to calculate the target delay, w may represent a predetermined scalar value used to calculate the target delay, $talkspurt_{Delay\_StdDev}$ may represent the standard deviation for each packet in a given talk spurt, and $TargetDelay_{Avg}$ may represent the average target delay of packets from the given talk spurt or the average target delay of packets from two or more talk spurts, and where updating $TargetDelay_{Avg}$ ensures that when the underflow rate is not improving, the $TargetDelay_{Avg}$ is always monotonically increasing.

In one example, f may be set at a value between 0.0 and 1.0, while w may be set at a value between 3 and 4. In some cases, f and w may be set at default values. For example, f may be set at 0.9 by default and w may be set at 3 by default. In some cases, f may remain constant for underflow-rate calculations, while w may be adjusted to adapt to changes in the calculated underflow rate. In some cases, w may act as a feedback mechanism for modifying the target delay according to detected changes in the underflow rate. In one example, w may be set to 3 initially and then incremented until a balance is reached between MOS and the delay being applied to incoming packets. As one example, w may be set at 3 and incremented by 0.2 (e.g., 3, 3.2, 3.4, 3.6, 3.8, 4.0). In another example, w may be set at 3 and incremented by 0.3 (e.g., 3, 3.3, 3.6, 3.9).

In some examples, the new techniques may implement supervised learning and/or non-linear regression to select the values of f and w. In one example, the new techniques identify the max deviation from mean for each talk spurt based on a set of existing logs of packet delays. The new techniques may be based on calculating a target delay (e.g., an ideal or optimal delay) on top of a mean delay after selecting the values of f and w. In some cases, the new techniques may change values for f and/or w to minimize a delta or difference between an average target delay and a maximum deviation from the mean delay for each talk spurt.

Once f and w are selected, the new techniques may apply the same formula on more logs and quantify the performance by comparing against the underflow-based dejittering. In one example, a target delay of 40 ms may be applied to prevent dejittering from being too sensitive to small jitters in clean channel conditions. In one example, a maximum target delay of 100 ms may be considered to be applied in certain noisy channel conditions.

Upon determining an appropriate target delay, the present techniques may apply the target delay to at least one packet from the talk spurt. In some cases, the target delay for the talk spurt may be based at least in part on an underflow rate of a dejitter buffer of the digitized voice system. Additionally or alternatively, the target delay for the talk spurt may be based at least in part on a number of packets in the talk spurt. By using the delay standard deviation from the mean delay and a Gaussian model for audio packet delay distribution, the new techniques improve the quality of the target delay selected for audio dejittering, while minimalizing additional operational delays.

In some cases, the mean delay may fail to converge and/or the mean delay may end up diverging. In the case where the mean delay is unable to converge or it diverges at some point after convergence, the new techniques may bypass applying the mean delay optimization described herein and may fall back to a default jitter buffer process. As a result, jitter buffer performance with the new techniques of mean delay improvement described herein will not be any worse than a different jitter buffer in those cases where mean delay is not stable or useful due to convergence failure and/or divergence.

To determine whether the mean delay has converged, a running average of the number of speech packets in a first talk spurt may be maintained and the mean delay for one or more packets may be identified (i.e., window_avg). In one example, the average of the next number of speech packets in a second talk spurt after the first talk spurt may be calculated and the mean delay of the packets in the second talk spurt may be identified (i.e., new_avg). In some cases, the new techniques may consider the mean delay to be/have converged (i.e., running_avg) after determining that the absolute difference between new_avg and window_avg is within a predetermined convergence threshold.

In some examples, the new techniques may be used to temporarily disable the mean delay adjustment and repeat the process to identify a new mean delay after determining a first packet of a talk spurt deviates from the converged mean (e.g., running_avg) by more than a mean delay threshold. In some examples, the new techniques may temporarily disable the mean delay optimization or improvement techniques and repeat the process to identify a new mean delay after determining the new_avg is differing from the window_avg by more than the convergence threshold.

FIG. 1 illustrates an example of a wireless communications system 100 that supports using delay standard deviation to improve audio dejittering in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, a voice over internet protocol (VoIP) network, a voice over LTE (VoLTE) network, a voice over wireless local area network (VoWLAN), or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 are supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas.

MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals.

For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115.

Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

One or more of the base stations 105 may include a dejittering manager, which may be configured to improve audio dejittering in a device (e.g., at least one of UEs 115). In some cases, the one or more base stations 105, in conjunction with a dejittering manager, may calculate and/or use a delay standard deviation to improve or optimize audio dejittering. Additionally or alternatively, UEs 115 may include a dejittering manager 102, which may be configured to improve audio dejittering in a device (e.g., at least one of UEs 115).

In some cases, wireless communications system 100 may include one or more wireless local area networks (WLANs) (also known as a Wi-Fi network) configured in accordance with various aspects of the present disclosure. A WLAN, such as a Wi-Fi (i.e., Institute of Electrical and Electronics Engineers (IEEE) 802.11) network, may include an access point (AP) that may communicate with one or more stations (STAs) or mobile devices (e.g., UEs 115). The AP may be in communication with an external network, such as the Internet, and may enable a STA to communicate with the external network or another STA via the AP. A STA may communicate with an associated AP via downlink and uplink. The downlink (or forward link) may refer to the communication link from the AP to the STA, and the uplink (or reverse link) may refer to the communication link from the STA to the AP.

In one example, the WLAN may include an AP and multiple associated STAs, which may represent devices such as mobile stations, personal digital assistant (PDAs), other handheld devices, netbooks, notebook computers, tablet computers, laptops, display devices (e.g., TVs, computer monitors, etc.), printers, etc. The AP and the associated stations may represent a BSS or an ESS. The various STAs in the network are able to communicate with one another through the AP. The AP may include a coverage area (e.g., coverage area 110), which may represent a BSA of the WLAN. An extended network station (not shown) associated with the WLAN may be connected to a wired or wireless distribution system that may allow multiple APs to be connected in an ESS.

In some cases, a STA may be located in the intersection of more than one coverage area and may associate with more than one AP. A single AP and an associated set of STAs may be referred to as a BSS. An ESS is a set of connected BSSs. A distribution system (not shown) may be used to connect APs in an ESS. In some cases, the coverage area of an AP may be divided into sectors (also not shown). The WLAN may include APs of different types (e.g., metropolitan area, home network, etc.), with varying and overlapping coverage areas. Two STAs may also communicate directly via a direct wireless link regardless of whether both STAs are in the same coverage area. Examples of direct wireless links may include Wi-Fi Direct connections, Wi-Fi Tunneled Direct Link Setup (TDLS) links, and other group connections. STAs and APs may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN.

In some cases, a STA (or an AP) may be detectable by a central AP, but not by other STAs in the coverage area of the central AP. For example, one STA may be at one end of the coverage area of the central AP while another STA may be at the other end. Thus, both STAs may communicate with the AP, but may not receive the transmissions of the other. This may result in colliding transmissions for the two STAs in a contention based environment (e.g., carrier-sense multiple access with collision avoidance (CSMA/CA)) because the STAs may not refrain from transmitting on top of each other. A STA whose transmissions are not identifiable, but that is within the same coverage area may be known as a hidden node. CSMA/CA may be supplemented by the exchange of a Request to Send (RTS) packet transmitted by a sending STA (or AP) and a Clear to Send (CTS) packet transmitted by the receiving STA (or AP). This may alert other devices within range of the sender and receiver not to transmit for the duration of the primary transmission. Thus, RTS/CTS may help mitigate a hidden node problem.

One or more of the APs may include a dejittering manager, which may be configured to improve audio dejittering in a device (e.g., a STA). In some cases, the one or more APs, in conjunction with a dejittering manager, may calculate and/or use a delay standard deviation to improve or optimize audio dejittering. Additionally or alternatively, one or more STAs may include a dejittering manager 102, which may be configured to improve audio dejittering in a device (e.g., a STA).

Figure 2:
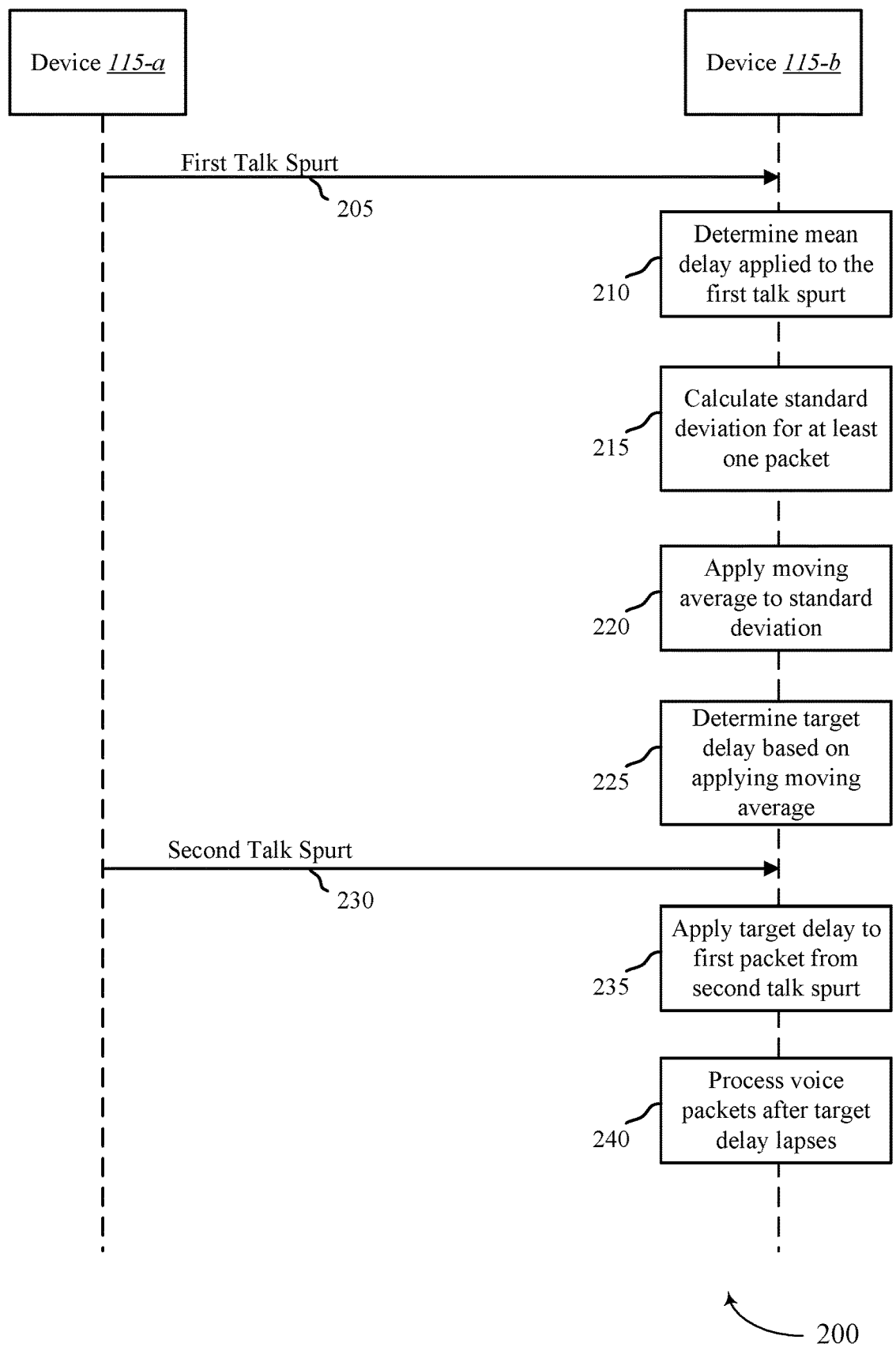
FIG. 2 illustrates an example of a data flow diagram that supports using delay standard deviation to improve audio dejittering in accordance with aspects of the present disclosure.

FIG. 2 illustrates an example of a data flow diagram 200 that supports using delay standard deviation to improve audio dejittering in accordance with aspects of the present disclosure. In some examples, one or more parts of data flow diagram 200 may be implemented by or based on aspects of wireless communications system 100 described herein.

As illustrated, device 115-a (which may be an example of UE 115 in some cases) may send first talk spurt 205 to device 115-b. In one example, device 115-a and device 115-b may be examples of mobile devices (e.g., UE 115 of FIG. 1).

At 210, device 115-b may determine a delay, such as a mean delay, applied to packets of first talk spurt 205. In some cases, device 115-b may determine a mean delay applied to packets of first talk spurt 205 and/or one or more additional talk spurts sent by device 115-a to device 115-b before first talk spurt 205 and/or after first talk spurt 205.

At 215, device 115-b may calculate a parameter, such as a standard deviation, for at least one packet from first talk spurt 205 and/or one or more other talk spurts sent by device 115-a to device 115-b. At 220, device 115-b may apply an adjustment or factor, such as a moving average, to the parameter calculated in 215. At 225, device 115-b may determine a second delay, such as a target delay, based on applying the adjustment or factor to the standard deviation calculated in 215.

As shown, device 115-a may send second talk spurt 230 to device 115-b. In some cases, second talk spurt 230 may be the next talk spurt after first talk spurt 205. Alternatively, one or more other talk spurts may be sent to device 115-b by device 115-a after first talk spurt 205 and before second talk spurt 230, or vice versa.

At 235, device 115-b may apply the second delay to one or more packets, such as a first packet, from second talk spurt 230. After applying the second delay (e.g., a target delay), device 115-b may wait to process second talk spurt 230 until after a duration (e.g., until the applied target delay lapses). At 240, device 115-b may process the packets (e.g., voice packets) of second talk spurt 230 after the applied target delay lapses.

In one example, device 115-a and/or device 115-b may include a dejittering manager, which may be configured to improve audio dejittering in device 115-a and/or device 115-b. In some cases, device 115-a and/or device 115-b may communicate data (e.g., talk spurts) using VoWLAN and/or VoLTE networks.

Figure 3:
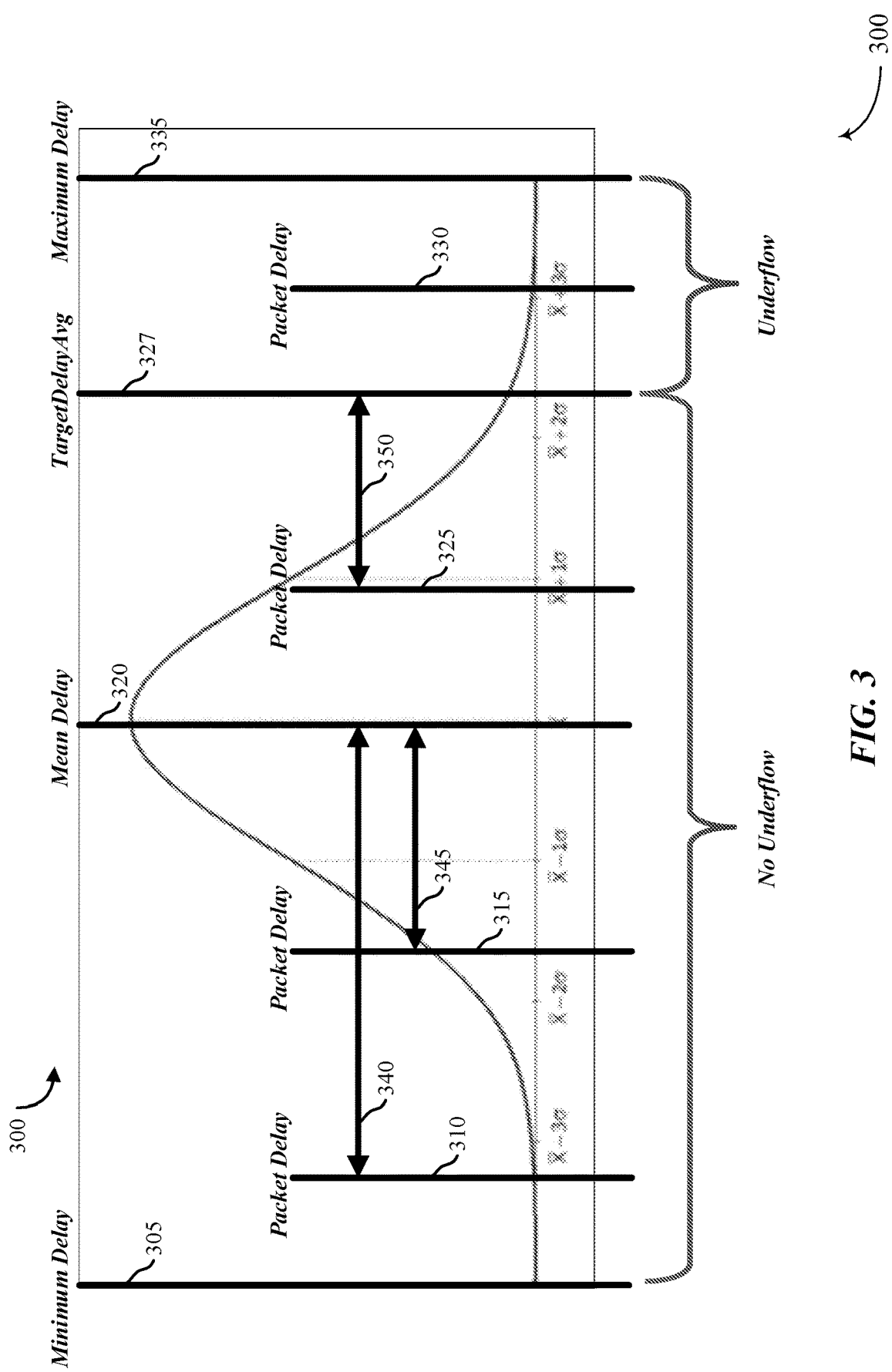
FIG. 3 illustrates an example of a Gaussian distribution that supports using delay standard deviation to improve audio dejittering in accordance with aspects of the present disclosure.

FIG. 3 illustrates an example of a distribution 300 of packet delays that supports using delay standard deviation to improve audio dejittering in accordance with aspects of the present disclosure. In some examples, distribution 300 (which may in some cases be an Gaussian distribution) may be implemented by or based on aspects of wireless communications system 100 described herein.

In one example, the distribution of packet delays in an audio traffic model may be modeled based on a continuous probability distribution (e.g., Gaussian distribution). In one example, the new techniques may relate to, use or be based on a distribution as the audio traffic model for the packet delay distribution. Distribution 300 may depict a distribution of packet delays experienced by packets arriving at a receiving device (e.g., mobile phone receiving voice packets sent by another mobile phone). Distribution 300 shows that the amount of underflows are at the mercy of the first packet arrival time.

As illustrated, distribution 300 may include minimum delay 305 that shows the minimum delay applied to voice packets in a packet voice communication system, and maximum delay 335 applied to voice packets in the packet voice communication system. As shown, distribution 300 may include mean delay 320 applied to packets in the packet voice communication system. Although aspects of the disclosure describe examples related to a Gaussian distribution, other distributions and implementation are specifically contemplated and the disclosure should be limited to any specific example.

In one example, a first packet of a talk spurt may have a packet delay below mean delay 320 (e.g., packet delay 310, packet delay 315), may have a packet delay at mean delay 320, or may have a packet delay above mean delay 320 (e.g., packet delay 325, packet delay 330). In some cases, a first packet of a talk spurt may have a packet delay above an average target delay 327 (e.g., packet delay 330).

In some cases, target delay may be added to (e.g., the beginning of) each talk spurt so that the playout of the first packet may be delayed by the target delay time to accommodate higher packet delays (i.e., jitters) that may occur during the talk spurt in order to avoid underflows.

The mean delay of the packets may serve as a predictor to more intelligently determine whether delay needs to be added to or subtracted from the jitter buffer target delay. In one example, the new mean delay improvement techniques may relate to first evaluating and averaging one or more (e.g., in some cases all) the delays observed for a certain number of speech packets. Based on some hysteresis, once a converged and stable mean delay applied to the speech packets is derived (e.g., mean delay 320), the mean delay may be used to determine how much the first speech packet of each talk spurt is deviating from the mean and adjust the target delay of the talk spurt accordingly (i.e., to add or subtract the deviation to the jitter buffer target delay).

In one example of mean delay improvement, the new techniques may add additional delay to a first packet with packet delay 310 to get the delay up to the average target delay 327. For example, the new techniques may determine that packet delay 310 is below average target delay 327 and mean delay 320; determine a difference 340 between packet delay 310 and mean delay 320; add the determined difference 340 to packet delay 310 to get the delay of the first packet up to mean delay 320. Once the delay of the first packet is at mean delay 320, the new techniques may add the difference between mean delay 320 and average target delay 327 to get the delay of the first packet up to the average target delay 327. A similar process may be applied to a first packet with packet delay 315 based on difference 345.

In some cases, the new techniques may determine that packet delay 325 is below average target delay 327 and above mean delay 320; determine a difference 350 between packet delay 325 and average target delay 327; and add the determined difference 350 to packet delay 325 to get the delay of the first packet up to average target delay 327. In some cases, the new techniques may determine that packet delay 330 is above both average target delay 327 and mean delay 320 and then simply process the packet and/or associated packets without adding any additional delay.

Figure 4:
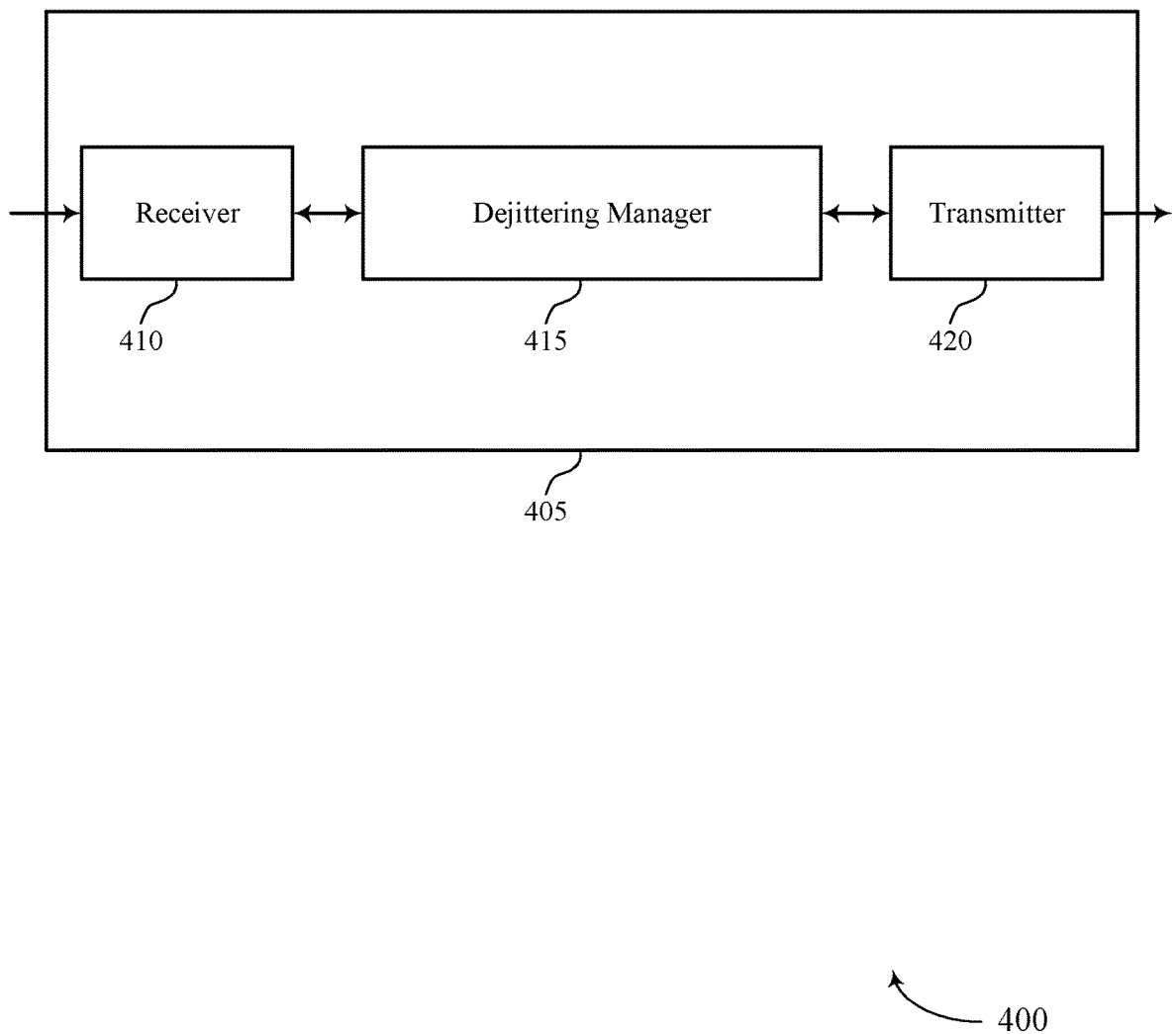
FIGS. 4 and 5 show block diagrams of devices that support using delay standard deviation to improve audio dejittering in accordance with aspects of the present disclosure.

FIG. 4 shows a block diagram 400 of a device 405 that supports using delay standard deviation to improve audio dejittering in accordance with aspects of the present disclosure. The device 405 may be an example of aspects of a device as described herein. The device 405 may include a receiver 410, a dejittering manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to using delay standard deviation to improve audio dejittering). Information may be passed on to other components of the device 405. The receiver 410 may be an example of aspects of the transceiver 720 described with reference to FIG. 7. The receiver 410 may utilize a single antenna or a set of antennas.

The dejittering manager 415 may determine a mean delay applied to packets in a packet voice communication system, calculate, from the mean delay, a standard deviation for at least a subset of packets in a talk spurt, determine a target delay for the talk spurt by applying a moving average to the standard deviation, and apply the target delay to a first packet from the talk spurt. The dejittering manager 415 may be an example of aspects of the dejittering manager 710 described herein.

The dejittering manager 415, or its sub-components, may be implemented in hardware, code (e.g., software or firmware) executed by a processor, or any combination thereof. If implemented in code executed by a processor, the functions of the dejittering manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The dejittering manager 415, or its sub-components, may be physically located at various positions, including being distributed such that portions of functions are implemented at different physical locations by one or more physical components. In some examples, the dejittering manager 415, or its sub-components, may be a separate and distinct component in accordance with various aspects of the present disclosure. In some examples, the dejittering manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
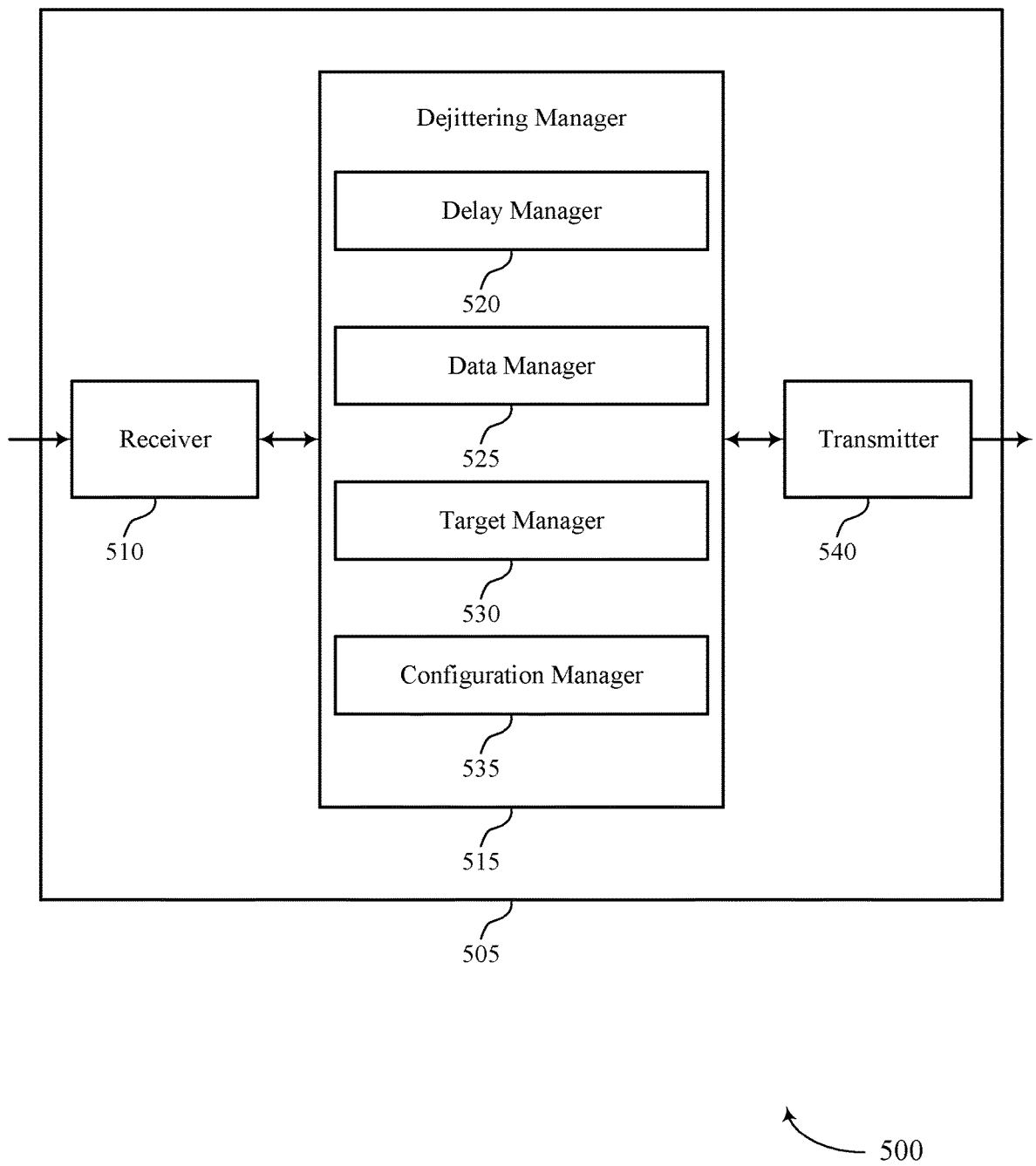

FIG. 5 shows a block diagram 500 of a device 505 that supports using delay standard deviation to improve audio dejittering in accordance with aspects of the present disclosure. The device 505 may be an example of aspects of a device 405 or a device 115 as described herein. The device 505 may include a receiver 510, a dejittering manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to using delay standard deviation to improve audio dejittering). Information may be passed on to other components of the device 505. The receiver 510 may be an example of aspects of the transceiver 720 described with reference to FIG. 7. The receiver 510 may utilize a single antenna or a set of antennas.

The dejittering manager 515 may be an example of aspects of the dejittering manager 415 as described herein. The dejittering manager 515 may include a delay manager 520, a data manager 525, a target manager 530, and a configuration manager 535. The dejittering manager 515 may be an example of aspects of the dejittering manager 710 described herein.

The delay manager 520 may determine a mean delay applied to packets in a packet voice communication system. The data manager 525 may calculate, from the mean delay, a standard deviation for at least a subset of packets in a talk spurt. The target manager 530 may determine a target delay for the talk spurt by applying a moving average to the standard deviation.

The configuration manager 535 may apply the target delay to a first packet from the talk spurt. The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
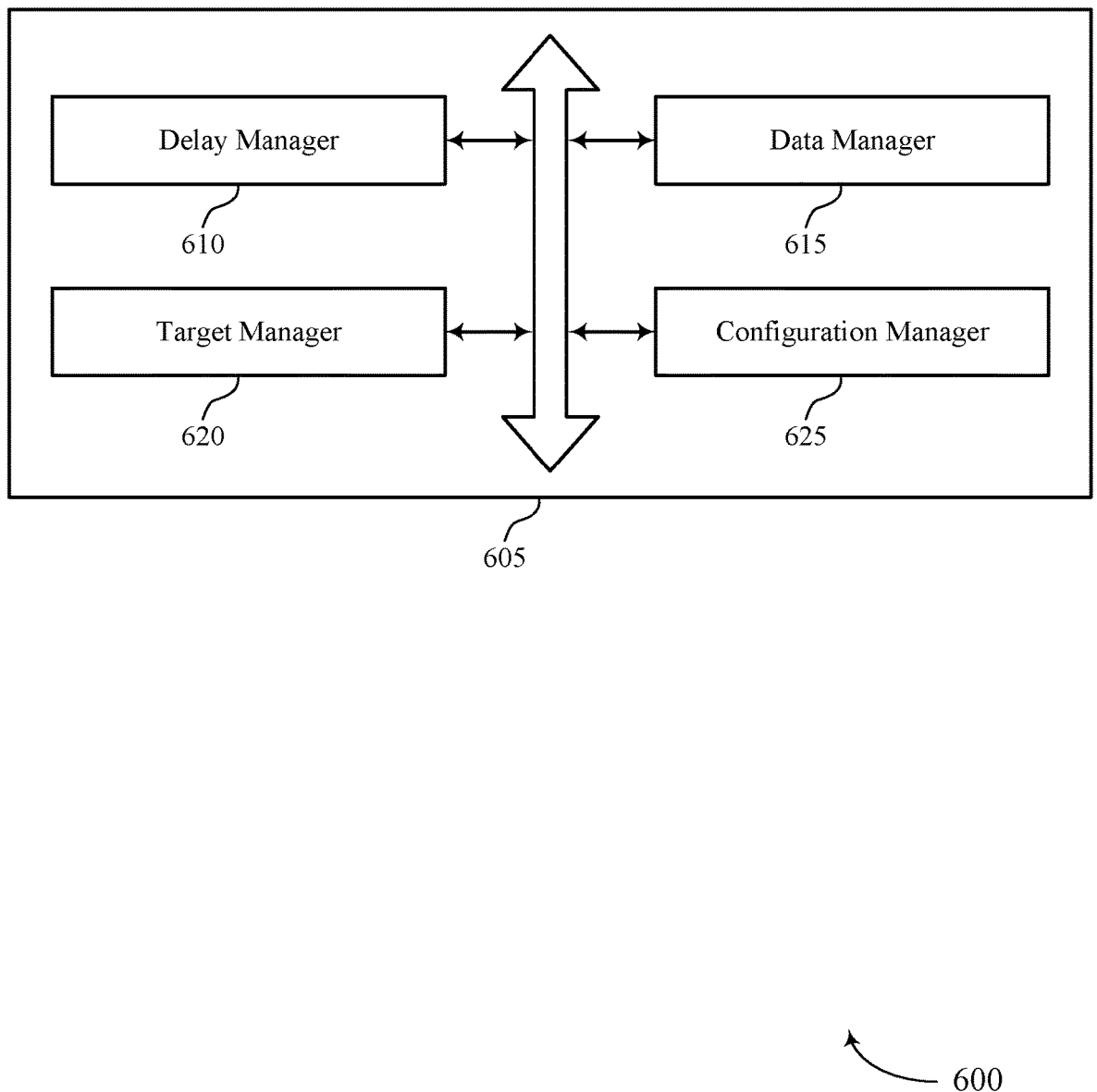
FIG. 6 shows a block diagram of a dejittering manager that supports using delay standard deviation to improve audio dejittering in accordance with aspects of the present disclosure.

FIG. 6 shows a block diagram 600 of a dejittering manager 605 that supports using delay standard deviation to improve audio dejittering in accordance with aspects of the present disclosure. The dejittering manager 605 may be an example of aspects of a dejittering manager 415, a dejittering manager 515, or a dejittering manager 710 described herein. The dejittering manager 605 may include a delay manager 610, a data manager 615, a target manager 620, and a configuration manager 625. Each of these modules may communicate, directly or indirectly, with one another (e.g., via one or more buses).

The delay manager 610 may determine a mean delay applied to packets in a packet voice communication system. The data manager 615 may calculate, from the mean delay, a standard deviation for at least a subset of packets in a talk spurt. In some examples, the data manager 615 may process at least the subset of packets in the talk spurt after determining the target delay applied to the first packet is lapsed.

In some examples, the data manager 615 may calculate, from the mean delay, a standard deviation for each packet in the talk spurt, where determining the target delay for the talk spurt by applying the moving average to the standard deviation is based on calculating the standard deviation for each packet in the talk spurt. In some examples, the data manager 615 may determine that the determined target delay is less than a predetermined minimum delay.

In some examples, the data manager 615 may determine that the determined target delay is greater than a predetermined maximum delay. In some examples, the data manager 615 may select a factor f and a scalar w. In some examples, the data manager 615 may use supervised learning, or non-linear regression, or both to select the factor f and the scalar w.

The target manager 620 may determine a target delay for the talk spurt by applying a moving average to the standard deviation. In some examples, the target manager 620 may set the target delay to the predetermined minimum delay. In some examples, the target manager 620 may set the target delay to the predetermined maximum delay.

In some examples, the target manager 620 may measure a mean delay for each packet in a set of packets from the packet system and determining whether the measured mean delay of each packet converges. In some examples, the target manager 620 may determine the target delay based on the factor f and the scalar w, where f, or w, or both, are tuned to achieve a balance between mean opinion score (MOS) of the packet voice communication system and the target delay.

In some cases, the target delay is based on an underflow rate of a dejitter buffer of the digitized voice system. In some cases, the target delay is based on a number of packets in the talk spurt. The configuration manager 625 may apply the target delay to a first packet from the talk spurt.

Figure 7:
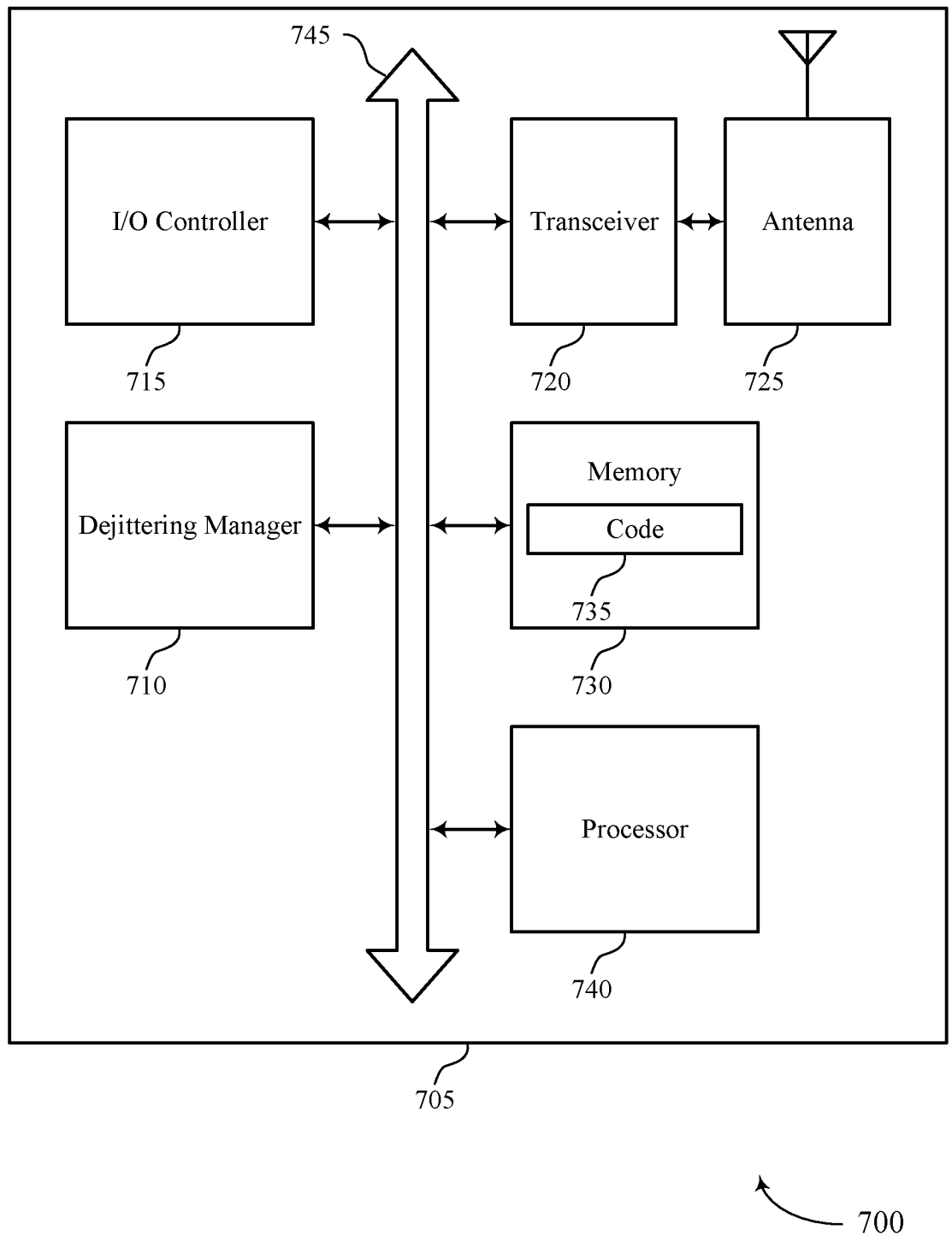
FIG. 7 shows a diagram of a system including a device that supports using delay standard deviation to improve audio dejittering in accordance with aspects of the present disclosure.

FIG. 7 shows a diagram of a system 700 including a device 705 that supports using delay standard deviation to improve audio dejittering in accordance with aspects of the present disclosure. The device 705 may be an example of or include the components of device 405, device 505, or a device as described herein. The device 705 may include components for bi-directional voice and data communications including components for transmitting and receiving communications, including a dejittering manager 710, an I/O controller 715, a transceiver 720, an antenna 725, memory 730, and a processor 740. These components may be in electronic communication via one or more buses (e.g., bus 745).

The dejittering manager 710 may determine a mean delay applied to packets in a packet voice communication system, calculate, from the mean delay, a standard deviation for at least a subset of packets in a talk spurt, determine a target delay for the talk spurt by applying a moving average to the standard deviation, and apply the target delay to a first packet from the talk spurt.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting using delay standard deviation to improve audio dejittering).

The code 735 may include instructions to implement aspects of the present disclosure, including instructions to support audio dejittering. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
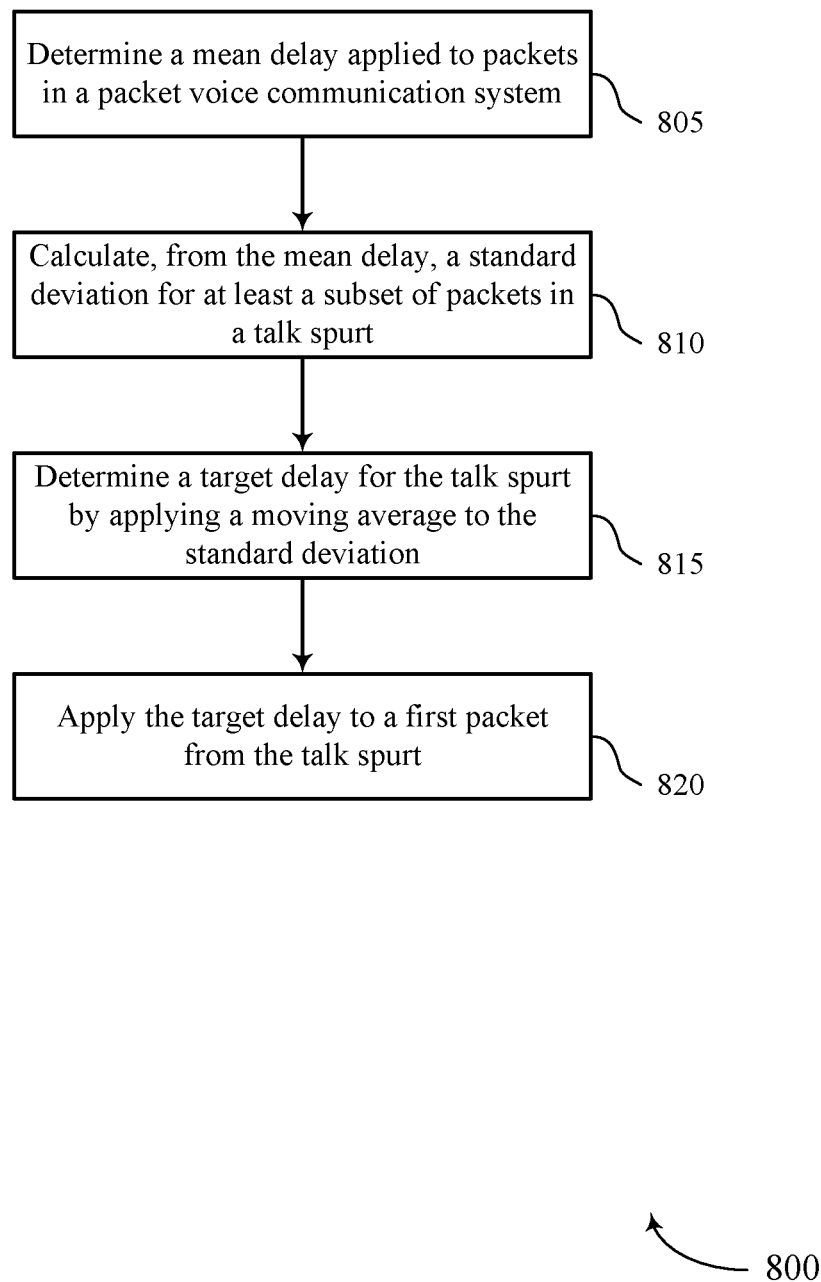
FIGS. 8 through 10 show flowcharts illustrating methods that support using delay standard deviation to improve audio dejittering in accordance with aspects of the present disclosure.

FIG. 8 shows a flowchart illustrating a method 800 that supports using delay standard deviation to improve audio dejittering in accordance with aspects of the present disclosure. The operations of method 800 may be implemented by a device or its components as described herein. For example, the operations of method 800 may be performed by a dejittering manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 805, the method 800 may include determining a mean delay applied to packets in a packet voice communication system. The operations of 805 may be performed according to the methods described herein. In some examples, aspects of the operations of 805 may be performed by a delay manager as described with reference to FIGS. 4 through 7.

At 810, the method 800 may include calculating, from the mean delay, a standard deviation for at least a subset of packets in a talk spurt. The operations of 810 may be performed according to the methods described herein. In some examples, aspects of the operations of 810 may be performed by a data manager as described with reference to FIGS. 4 through 7.

At 815, the method 800 may include determining a target delay for the talk spurt by applying a moving average to the standard deviation. The operations of 815 may be performed according to the methods described herein. In some examples, aspects of the operations of 815 may be performed by a target manager as described with reference to FIGS. 4 through 7.

At 820, the method 800 may include applying the target delay to a first packet from the talk spurt. The operations of 820 may be performed according to the methods described herein. In some examples, aspects of the operations of 820 may be performed by a configuration manager as described with reference to FIGS. 4 through 7.

Figure 9:
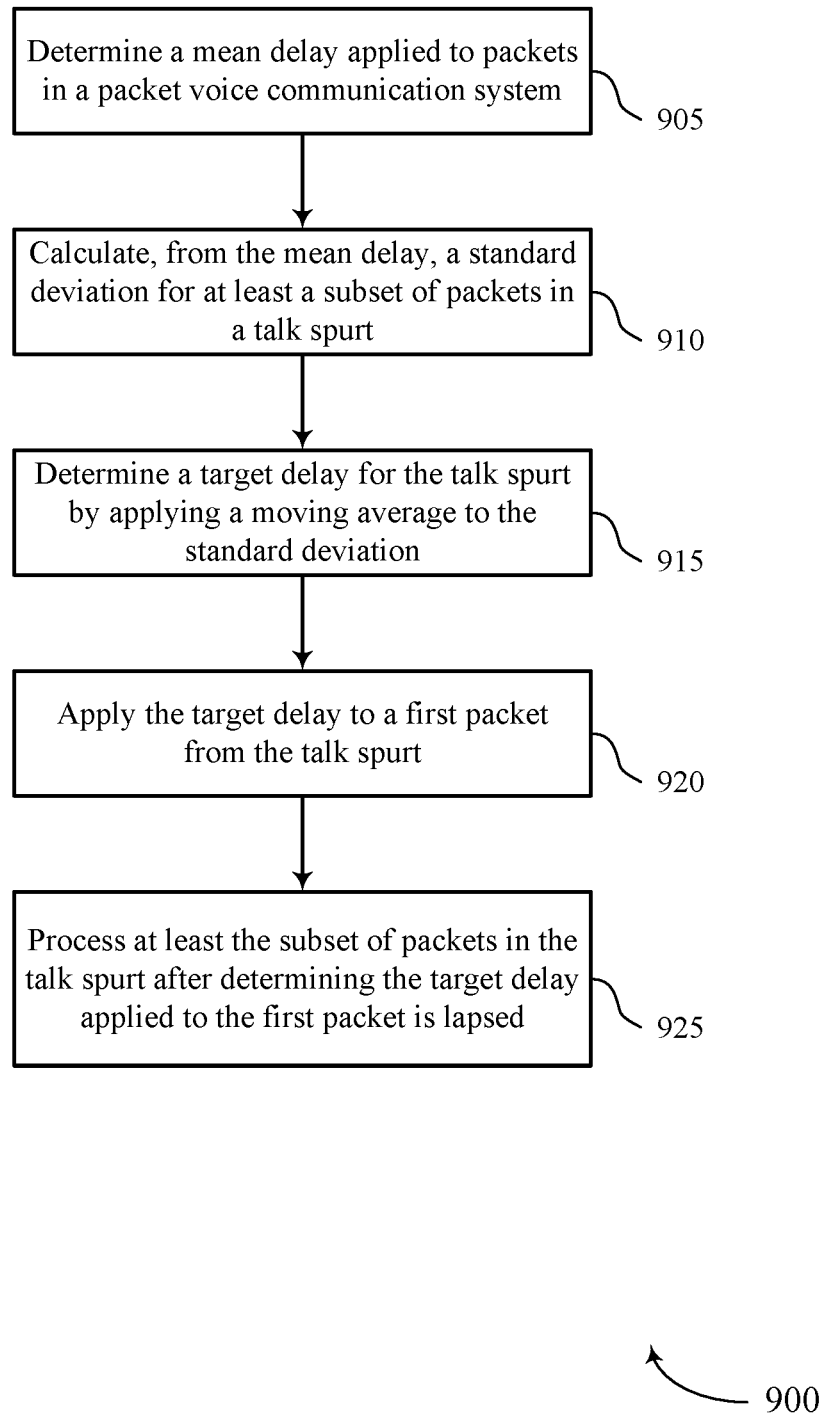

FIG. 9 shows a flowchart illustrating a method 900 that supports using delay standard deviation to improve audio dejittering in accordance with aspects of the present disclosure. The operations of method 900 may be implemented by a device or its components as described herein. For example, the operations of method 900 may be performed by a dejittering manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 905, the method 900 may include determining a mean delay applied to packets in a packet voice communication system. The operations of 905 may be performed according to the methods described herein. In some examples, aspects of the operations of 905 may be performed by a delay manager as described with reference to FIGS. 4 through 7.

At 910, the method 900 may include calculating, from the mean delay, a standard deviation for at least a subset of packets in a talk spurt. The operations of 910 may be performed according to the methods described herein. In some examples, aspects of the operations of 910 may be performed by a data manager as described with reference to FIGS. 4 through 7.

At 915, the method 900 may include determining a target delay for the talk spurt by applying a moving average to the standard deviation. The operations of 915 may be performed according to the methods described herein. In some examples, aspects of the operations of 915 may be performed by a target manager as described with reference to FIGS. 4 through 7.

At 920, the method 900 may include applying the target delay to a first packet from the talk spurt. The operations of 920 may be performed according to the methods described herein. In some examples, aspects of the operations of 920 may be performed by a configuration manager as described with reference to FIGS. 4 through 7.

At 925, the method 900 may include processing at least the subset of packets in the talk spurt after determining the target delay applied to the first packet is lapsed. The operations of 925 may be performed according to the methods described herein. In some examples, aspects of the operations of 925 may be performed by a data manager as described with reference to FIGS. 4 through 7.

Figure 10:
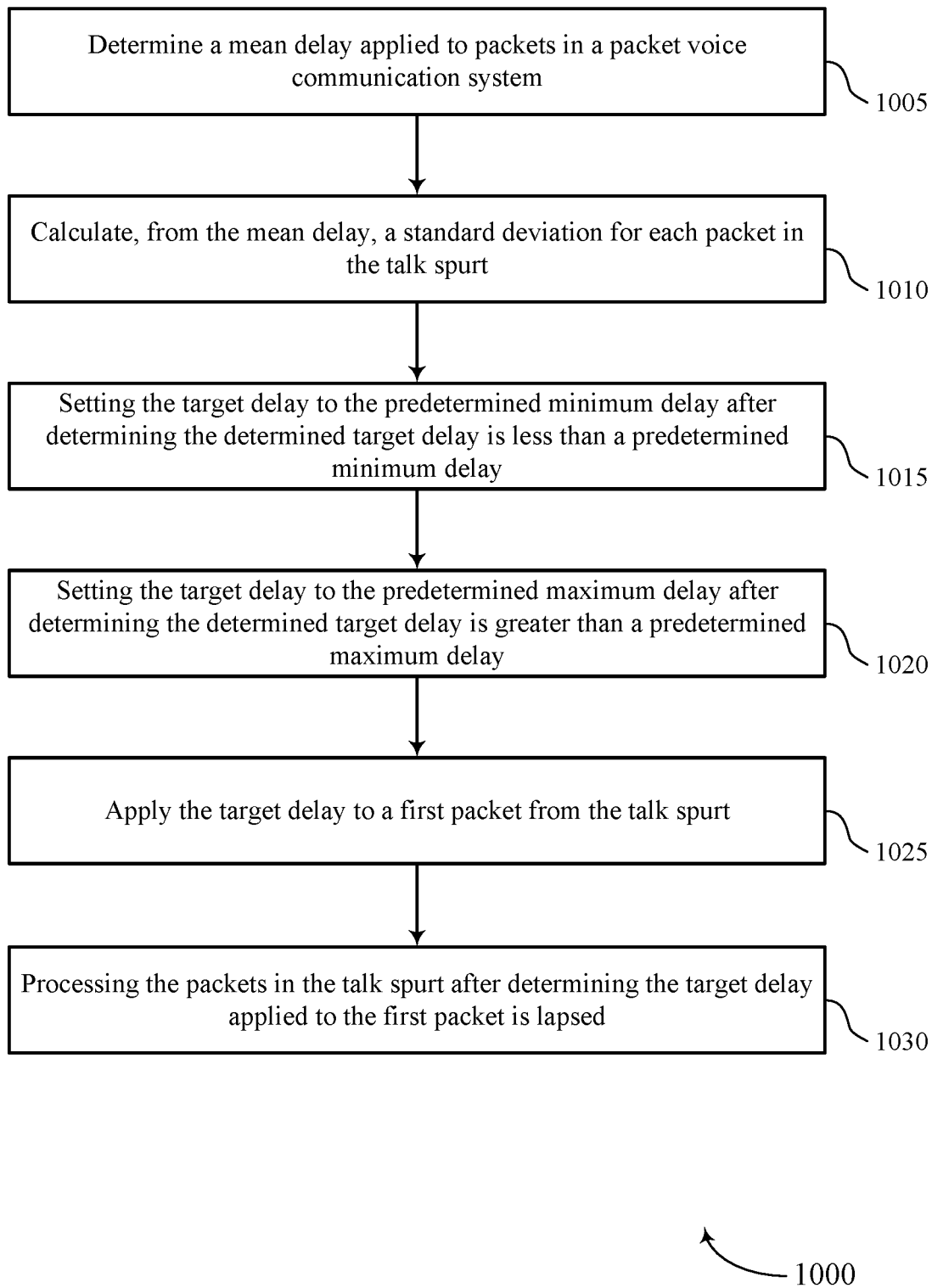

FIG. 10 shows a flowchart illustrating a method 1000 that supports using delay standard deviation to improve audio dejittering in accordance with aspects of the present disclosure. The operations of method 1000 may be implemented by a device or its components as described herein. For example, the operations of method 1000 may be performed by a dejittering manager as described with reference to FIGS. 4 through 7. In some examples, a device may execute a set of instructions to control the functional elements of the device to perform the functions described below. Additionally or alternatively, a device may perform aspects of the functions described below using special-purpose hardware.

At 1005, the method may include determining a mean delay applied to packets in a packet voice communication system. The operations of 1005 may be performed according to the methods described herein. In some examples, aspects of the operations of 1005 may be performed by a delay manager as described with reference to FIGS. 4 through 7.

At 1010, the method may include calculating, from the mean delay, a standard deviation for each packet in the talk spurt. The operations of 1010 may be performed according to the methods described herein. In some examples, aspects of the operations of 1010 may be performed by a data manager as described with reference to FIGS. 4 through 7.

At 1015, the method may include setting the target delay to the predetermined minimum delay after determining the determined target delay is less than a predetermined minimum delay. The operations of 1015 may be performed according to the methods described herein. In some examples, aspects of the operations of 1015 may be performed by a target manager as described with reference to FIGS. 4 through 7.

At 1020, the method may include setting the target delay to the predetermined maximum delay after determining the determined target delay is greater than a predetermined maximum delay. The operations of 1020 may be performed according to the methods described herein. In some examples, aspects of the operations of 1020 may be performed by a target manager as described with reference to FIGS. 4 through 7.

At 1025, the method may include applying the target delay to a first packet from the talk spurt. The operations of 1025 may be performed according to the methods described herein. In some examples, aspects of the operations of 1025 may be performed by a configuration manager as described with reference to FIGS. 4 through 7.

At 1030, the method may include processing the packets in the talk spurt after determining the target delay applied to the first packet is lapsed. The operations of 1030 may be performed according to the methods described herein. In some examples, aspects of the operations of 1030 may be performed by a data manager as described with reference to FIGS. 4 through 7.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for audio dejittering at a device, comprising:
   determining a mean delay applied to packets in a packet voice communication system;
   calculating, from the mean delay, a standard deviation for each packet of at least a subset of packets in a talk spurt;
   determining a target delay for the talk spurt based at least in part on a moving average corresponding to the standard deviation for each packet of at least the subset of packets in the talk spurt;
   applying the target delay to a first packet from the talk spurt; and
   processing at least the subset of packets in the talk spurt after determining the target delay applied to the first packet is lapsed.

2. The method of claim 1, further comprising:
   calculating, from the mean delay, a standard deviation for each packet in the talk spurt, wherein determining the target delay for the talk spurt by applying the moving average to the standard deviation is based at least in part on calculating the standard deviation for each packet in the talk spurt.

3. The method of claim 1, further comprising:
   determining that the determined target delay is less than a predetermined minimum delay; and
   setting the target delay to the predetermined minimum delay.

4. The method of claim 1, further comprising:
   determining that the determined target delay is greater than a predetermined maximum delay; and
   setting the target delay to the predetermined maximum delay.

5. The method of claim 1, wherein the target delay is based at least in part on an underflow rate of a dejitter buffer of the digitized voice system.

6. The method of claim 1, wherein the target delay is based at least in part on a number of packets in the talk spurt.

7. The method of claim 1, wherein determining the mean delay comprises:
   measuring a mean delay for each packet in a plurality of packets from the packet system and determining whether the measured mean delay of each packet converges.

8. The method of claim 1, further comprising:
   selecting a factor f and a scalar w; and
   determining the target delay based at least in part on the factor f and the scalar w, wherein f, or w, or both, are tuned to achieve a balance between mean opinion score (MOS) of the packet voice communication system and the target delay.

9. The method of claim 8, wherein selecting the factor f and the scalar w comprises:
   using supervised learning, or non-linear regression, or both to select the factor f and the scalar w.

10. An apparatus for audio dejittering, comprising:
    a processor, memory in electronic communication with the processor; and
    instructions stored in the memory and executable by the processor to cause the apparatus to:
      determine a mean delay applied to packets in a packet voice communication system;
      calculate, from the mean delay, a standard deviation for each packet of at least a subset of packets in a talk spurt;
      determine a target delay for the talk spurt based at least in part on a moving average corresponding to the standard deviation for each packet of at least the subset of packets in the talk spurt;
      apply the target delay to a first packet from the talk spurt; and
      process at least the subset of packets in the talk spurt after determining the target delay applied to the first packet is lapsed.

11. The apparatus of claim 10, wherein the instructions are further executable by the processor to cause the apparatus to:
    calculate, from the mean delay, a standard deviation for each packet in the talk spurt, wherein determining the target delay for the talk spurt by applying the moving average to the standard deviation is based at least in part on calculating the standard deviation for each packet in the talk spurt.

12. The apparatus of claim 10, wherein the instructions are further executable by the processor to cause the apparatus to:
    determine that the determined target delay is less than a predetermined minimum delay; and
    set the target delay to the predetermined minimum delay.

13. The apparatus of claim 10, wherein the instructions are further executable by the processor to cause the apparatus to:
    determine that the determined target delay is greater than a predetermined maximum delay; and
    set the target delay to the predetermined maximum delay.

14. The apparatus of claim 10, wherein the target delay is based at least in part on an underflow rate of a dejitter buffer of the digitized voice system.

15. The apparatus of claim 10, wherein the target delay is based at least in part on a number of packets in the talk spurt.

16. The apparatus of claim 10, wherein the instructions to determine the mean delay are executable by the processor to cause the apparatus to:
    measure a mean delay for each packet in a plurality of packets from the packet system and determine whether the measured mean delay of each packet converges.

17. An apparatus for audio dejittering, comprising:
    means for determining a mean delay applied to packets in a packet voice communication system;
    means for calculating, from the mean delay, a standard deviation for each packet of at least a subset of packets in a talk spurt;

means for determining a target delay for the talk spurt based at least in part on a moving average corresponding to the standard deviation for each packet of at least the subset of packets in the talk spurt;

means for applying the target delay to a first packet from the talk spurt; and means for processing at least the subset of packets in the talk spurt after determining the target delay applied to the first packet is lapsed.

* * * * *